United States Patent [19]

Kohlstadt et al.

[11] 4,336,171

[45] Jun. 22, 1982

[54] AQUEOUS BINDER DISPERSION FOR PRODUCING VULCANIZATION BONDS BETWEEN RUBBER AND A SOLID SUBSTRATE

[75] Inventors: Hans-Peter Kohlstadt, Essen; Riza N. Özelli, Neuss; Gerhard Gierenz, Solingen-Wald, all of Fed. Rep. of Germany

[73] Assignee: Henkel Kommanditgesellschaft auf Aktien (Henkel GaA), Dusseldorf-Holthausen, Fed. Rep. of Germany

[21] Appl. No.: 156,130

[22] Filed: Jun. 3, 1980

[30] Foreign Application Priority Data

Jun. 11, 1979 [DE] Fed. Rep. of Germany ....... 2923651

[51] Int. Cl.$^3$ .............................................. C08L 39/06
[52] U.S. Cl. .................................. 524/510; 427/388.3; 427/388.4; 156/307.3; 156/331.2; 156/331.4; 156/333; 524/516; 524/408
[58] Field of Search ............. 260/29.6 RW, 29.6 MN, 260/29.6 N, 29.7 W, 29.7 N; 525/377; 427/388.3, 388.4

[56] References Cited

U.S. PATENT DOCUMENTS

| | | | |
|---|---|---|---|
| 3,721,659 | 3/1973 | Cain | 525/377 |
| 3,878,134 | 4/1975 | Ozelli | 260/4 R |
| 4,076,661 | 2/1978 | Kassner | 260/29.7 W |
| 4,111,880 | 9/1978 | Abendroth | 260/29.7 W |

Primary Examiner—Paul R. Michl
Attorney, Agent, or Firm—Hammond & Littell, Weissenberger and Muserlian

[57] ABSTRACT

An aqueous binder dispersion for use in the production of composite bodies by vulcanizing a vulcanizable rubber composition on a substrate which is stable under vulcanization conditions comprising water and at least one emulsifier and a solids content of from 20% to 50% by weight of a solids composition of, (a) per 1000 parts by weight of a polymer selected from the group consisting of polyvinylidene chloride, vinylidene chloride/alkyl acrylate copolymers, butadiene/acrylonitrile copolymers and mixtures thereof,
(b) from 100 to 500 parts by weight of at least one aromatic poly-C-nitroso compound,
(c) from 50 to 300 parts by weight of masked polyfunctional isocyanates,
(d) from 20 to 100 parts by weight of a water-soluble polymer selected from the group consisting of polyvinyl pyrrolidone and water-soluble copolymers of vinyl pyrrolidone, and
(e) from 5 to 500 parts by weight of customary fillers and pigments, adhesion-improving resins based on formaldehyde condensation products, adhesion-improving condensation products based on epichlorohydrin condensation products; emulsifiers and antifoam agents; as well as the method of bonding rubbers to solid substrates employing said aqueous binder dispersion.

2 Claims, No Drawings

AQUEOUS BINDER DISPERSION FOR PRODUCING VULCANIZATION BONDS BETWEEN RUBBER AND A SOLID SUBSTRATE

BACKGROUND OF THE INVENTION

The subject matter of the present invention is an aqueous binder dispersion for use in the production of composite bodies by vulcanizing a vulcanizable natural and/or synthetic rubber on a stable substrate.

Adhesion assistants or binders for the bonding rubber by vulcanization onto substrates which are stable under vulcanization conditions, such as metals or plastics or elastomers, have been known for a long time. The binders suitable for the universal bonding of elastomeric materials with metallic substrates at elevated temperatures contain normally polymeric film-formers, bonding aids, fillers and additives, as well as organic solvents. U.S. Pat. No. 3,878,134, issued Apr. 15, 1975 to Ozelli et al, describes some such compositions. Products which contain halogenated or chlorosulfonated rubbers as film-formers, polyfunctional isocyanates and/or organo-functional silanes, as well as aromatic poly-nitroso compounds, as bonding aids, carbon black, silica, basic lead phosphite and/or zinc oxide as fillers and additives, as well as aromatic and/or halogenated hydrocarbons as solvents, represent a preferred group.

Also known are binders which contain as main components aqueous dispersions or solutions of special rubbers containing carboxyl groups, together with customary solvents, as well as the combination of aqueous polymer dispersions with resorcinol resins. Finally, compositions of organic oligomeric or polymeric film-formers, aromatic poly-nitroso compounds and organofunctional phosphonic acids or phosphoric acid partial esters are also known for this purpose, as described in U.S. Pat. No. 4,111,880, issued Sept. 5, 1978 to Abendroth et al.

While the conventional solvent-containing binders have the disadvantages with regard to toxicity, combustibility, economy, etc., connected with the use of organic solvents, the presently known binders based on aqueous dispersions or solutions do not show these disadvantages. However, what hinders broader use of the aqueous binder dispersions is their lack of universality with respect to the elastomeric substrate to be bonded.

OBJECTS OF THE INVENTION

An object of the present invention is, therefore, to develop a universally applicable stable one-component binder for bonding a plurality of rubber types at elevated temperatures to a variety of substrates, which contain no volatile organic solvents or other polluting substances and yet furnish firm and resistant bonds.

Another object of the present invention is the obtaining of an aqueous binder dispersion for use in the production of composite bodies by vulcanizing a vulcanizable rubber composition on a substrate which is stable under vulcanization conditions comprising water and at least one emulsifier and a solids content of from 20% to 50% by weight of a solids composition of, (a) per 1000 parts by weight of a polymer selected from the group consisting of polyvinylidene chloride, vinylidene chloride/alkyl acrylate copolymers, butadiene/acrylonitrile copolymers and mixtures thereof, (b) from 100 to 500 parts by weight of at least one aromatic poly-C-nitroso compound, (c) from 50 to 300 parts by weight of masked polyfunctional isocyanates, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents.

A further object of the present invention is the improvement in the process of producing composite bodies by bonding vulcanizable rubber compositions to solid substrates stable under vulcanization conditions comprising coating a solid substrate stable under vulcanizing conditions with an adhesion assistant or binder, laminating a vulcanizable rubber composition thereto and vulcanizing the laminate, the improvement consisting of employing an aqueous binder dispersion comprising water and at least one emulsifier and a solids content of from 20% to 50% by weight of a solids composition of, (a) per 1000 parts by weight of a polymer selected from the group consisting of polyvinylidene chloride, vinylidene chloride/alkyl acrylate copolymers, butadiene/acrylonitrile copolymers and mixtures thereof, (b) from 100 to 500 parts by weight of at least one aromatic poly-C-nitroso compound, (c) from 50 to 300 parts by weight of masked polyfunctional isocyanates, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents; as said adhesion assistant or binder.

These and other objects of the invention will become more apparent as the description thereof proceeds.

DESCRIPTION OF THE INVENTION

The drawbacks of the adhesion assistants or binders of the prior art were solved and the objects of the invention were achieved by the present invention of a binder in the form of an aqueous dispersion, which contains, per (a) 1000 parts by weight of polyvinylidene chloride or vinylidene chloride/acrylic acid ester copolymer and/or butadiene/acrylonitrile copolymer, (b) 100 to 500 parts by weight of polyfunctional aromatic C-nitroso compounds, (c) 50 to 300 parts by weight of masked polyfunctional isocyanates, (d) 20 to 100 parts by weight of polyvinyl pyrrolidone or water-soluble copolymers of vinyl pyrrolidone, (e) 5 to 500 parts by weight of additional adhesion aids, and pigments, carbon black, antifoaming agents and/or emulsifiers, etc.

More particularly, the present invention relates to an aqueous binder dispersion for use in the production of composite bodies by vulcanizing a vulcanizable rubber composition on a substrate which is stable under vulcanization conditions comprising water and at least one emulsifier and a solids content of from 20% to 50% by weight of a solids composition of, (a) per 1000 parts by weight of a polymer selected from the group consisting of polyvinylidene chloride, vinylidene chloride/alkyl acrylate copolymers, butadiene/acrylonitrile copolymers and mixtures thereof, (b) from 100 to 500 parts by weight of at least one aromatic poly-C-nitroso compound, (c) from 50 to 300 parts by weight of masked polyfunctional isocyanates, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents.

The invention also relates to the improvement in the process of producing composite bodies by bonding vulcanizable rubber compositions to solid substrates stable under vulcanization conditions comprising coating a solid substrate stable under vulcanizing conditions with an adhesion assistant or binder, laminating a vulcanizable rubber composition thereto and vulcanizing the laminate, the improvement consisting of employing an aqueous binder dispersion comprising water and at least one emulsifier and a solids content of from 20% to 50% by weight of a solids composition of, (a) per 1000 parts by weight of a polymer selected from the group consisting of polyvinylidene chloride, vinylidene chloride/alkyl acrylate copolymers, butadiene/acrylonitrile copolymers and mixtures thereof, (b) from 100 to 500 parts by weight of at least one aromatic poly-C-nitroso compound, (c) from 50 to 300 parts by weight of masked polyfunctional isocyanates, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents, as said adhesion assistant or binder.

The polyvinylidene chloride, copolymers based on vinylidene chloride or butadiene/acrylonitrile copolymerizates, are commercial products which are already offered as aqueous dispersions. Suitable as a comonomer in the polymerization of copolymers with vinylidene chloride is primarily methyl acrylate. Butadiene and acrylonitrile can be copolymerized in various ratios from about 5% to 45% acrylonitrile. Furthermore, vinyl chloride, vinyl acetate, styrene and free acrylic acid or methacrylic acid, in addition to acrylonitrile, are suitable comonomers for both types of copolymerization. By suitable selection of the comonomers and their amount, it is possible to vary the properties of the polymers in the desired manner. The dispersed polymers that can be used for this purpose are film-forming thermoplasts, which are suitable for coating fabrics, paper, foils, or as binders for various fibers or raw materials for adhesives.

The nitroso compounds suitable for the production of binders according to the invention are aromatic poly-C-nitroso compounds which can be derived from various aromatic hydrocarbons. Particularly suitable are those aromatic poly-C-nitroso compounds with 1 to 3 aromatic nuclei, including anellated ones, which contain from 2 to 6 nitroso groups which are linked directly to non-adjacent nuclear carbon atoms. The preferred poly-C-nitroso compounds are dinitrosobenzenes and dinitrosonaphthalenes, that is, meta- or para-dinitrosobenzene and meta- or para-dinitrosonaphthalene. The cyclic hydrogen atoms of the aromatic nucleus can be substituted by alkyl, alkoxy, cycloalkyl, aryl, aralkyl, alkaryl, arylamino, aryl-nitroso, amino, halogen and similar radicals. The presence of these substituents in the aromatic nucleus or ring has little effect on the activity of the poly-C-nitroso compounds. Suitable aromatic poly-C-nitroso compounds for the purpose of the invention are also 2,5-di-nitroso-p-cymene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene.

Naturally, also, the nitroso group-forming compounds, namely oximes with oxidizing agents, can be used. From 100 to 500 parts of the aromatic poly-C-nitroso compounds are employed in the aqueous dispersion per 1000 parts of the polymer film-former.

The masked polyfunctional isocyanates used according to the invention as the third essential component are derived from the technologically versatile commercial isocyanates. The so-called isocyanate-masked polyisocyanate compounds are derived from diisocyanates, particularly aromatic diisocyanates such as toluylene diisocyanate, naphthalene diisocyanate, isophorone diisocyanate, diphenylmethane diisocyanate, dimerized toluylene diisocyanate, as well as hexamethylene diisocyanate and others. In addition, polyfunctional isocyanates, particularly aromatic polyisocyanates, such as triphenylmethane triisocyanate, or the addition product of 3 mols of toluylenediisocyanate onto 1 mol of trimethylol propane can be utilized. Suitable as agents for masking the isocyanate groups are, for example, phenols, alcohols, preferably tertiary alkanols such as tert.-amyl alcohol or tert.-butanol, compounds containing a carbonyl-activated methylene group such as esters of acetoacetic acid, esters of malonic acid, acetylacetone, butanone-oxime, and dicarboxylic acid imides such as phthalimide, or imidazole.

The isocyanate-masked poly-isocyanate compounds are produced either at room temperature or preferably at 100° C. The addition of compounds with a reactive methylene group, such as malonate esters and acetoacetate esters, requires catalytic amounts of sodium or sodium lower alkanolates. The additions can be effected in the presence or absence of inert solvents.

Polyvinyl pyrrolidone of component (d) can be used alone as a customary technical product with a K-value of about 30 to 90, or water-soluble copolymers of vinyl pyrrolidone can be employed, such as vinyl acetate/vinyl pyrrolidone. Suitable also are copolymers of vinyl pyrrolidone which contain, as co-monomers, other vinyl esters, (meth)acrylic acid esters or (meth)acrylamide as well as vinyl chloride. A prerequisite for use in the combinations according to the invention is a good water-solubility. Particularly, polymers with a higher K-value have a stabilizing effect on the dispersions.

Naturally, the mixtures of the above-mentioned compounds should also contain known auxiliary substances. Particularly, it is preferable to have from 0 to 200 parts, especially from 25 to 100 parts by weight of formaldehyde or epichlorohydrin condensation resins, as adhesion-improving resins. The adhesion-improving resins or preliminary resin stages of the formaldehyde condensation products with phenol, alkylphenol, resorcinol resin, resol, novolak, are customarily employed. In addition, the condensation products of epichlorohydrin and polyvalent phenols like diphenol propane, styrene-maleic anhydride copolymer, etc., can also be employed as adhesion-improving resins. Finally, the dispersions according to the invention can contain customary adhesion-improving fillers, preferably in amounts of from 0 to 500 parts by weight. These are carbon black, silica, zinc oxide, basic lead phosphite, etc. If necessary, pigments can also be incorporated.

Suitable as dispersion agents are primarily surface-active compounds, particularly nonionic surface-active compounds, for example, the ethylene oxide adducts with alkylphenols, like nonyl phenol or fatty alcohols or fatty alcohol-partial esters with phosphoric acid. Stabilizers for the dispersion, which also can be used, are the water-soluble colloids, like methyl cellulose, methylhydroxypropyl cellulose, hydroxyethyl cellulose, polyvinyl alcohol, etc. The emulsifiers and stabilizers are customarily employed in amounts of from 5 to 40 parts by weight, per 1000 parts of the film-forming polymer.

The total amount of customary fillers and pigments, adhesion-improving resins based on formaldehyde condensation products and epichlorohydrin condensation products, emulsifiers and antifoam agents of component (e) are from 5 to 500 parts by weight per 1000 parts by weight of film-forming polymers.

It was found that the binders according to the invention are suitable for bonding a plurality of vulcanizable elastomeric materials with themselves or with other substrates. We mention here mixtures based on natural rubber and synthetic rubbers such as polychloroprene rubber, styrene/butadiene rubber, nitrile rubber, rubber from ethylene/propylene copolymers (EPM), butyl rubber, polyurethane rubber, etc. The substrates stable under vulcanization conditions are particularly metals, like iron, stainless steel, lead, aluminum, copper, brass, bronze, Monel metal, nickel, zinc, and so forth, including treated metals, such as phosphatized steel, galvanized steel, and, finally, glass and ceramic materials.

The binders are applied on the substrate surfaces by conventional methods, like dipping, spraying, brushing etc. Under certain circumstances it may be advisable to use a preliminary treatment with an adhesion-improving agent (primer) of chlorinated rubber, phenol/formaldehyde resin and so forth. The substrate surfaces are allowed to dry after the coating, before they are assembled. After the surfaces have been assembled, the compound structures are heated in known manner to effect the vulcanization.

The binders according to the invention should have such a solid content that they are still spreadable or sprayable. The solid content is preferably between about 20% and 50% by weight. Organic solvents can also be used in minor amounts, but their portion should not exceed 5% by weight of the liquid phase.

The following examples are illustrative of the practice of the invention without being deemed limitative.

EXAMPLES

In the following examples, the rubber mixtures designated below with A, B, C, D and E were vulcanized on substrates. The compositions of the mixture, as well as the vulcanization conditions are indicated below. All parts are by weight unless otherwise specified.

|  | Parts |
|---|---|
| MIXTURE A (NR) | |
| Natural Rubber (smoked sheet) | 100 |
| Zinc oxide | 10 |
| Stearic acid | 2 |
| Phenyl-β-naphthyl amine | 1 |
| Pine tar | 2 |
| Carbon black CK3 | 25 |
| Zn—dimethyldithiocarbamate | 0.33 |
| Dibenzothiazyl disulfide | 0.58 |
| Sulfur | 2.75 |
| Vulcanization conditions: 10 minutes at 153° C. | |
| MIXTURE B (SBR) | |
| Styrene/butadiene rubber | 100 |
| Zinc oxide | 5 |
| Stearic acid | 1 |
| FEF carbon black (Corax 3) | 50 |
| Saturated polymeric petroleum hydrocarbons (liquid) | 8 |
| N-cyclohexyl-2-benzothiophthalimide | 0.2 |
| Benzothiazyl-2-cyclohexyl sulfenamide | 0.95 |
| Sulfur | 1.6 |
| Vulcanization conditions: 30 minutes at 153° C. | |
| MIXTURE C (CR) | |
| Polychloroprene rubber | 100 |
| Magnesium oxide | 4 |
| Phenyl-β-naphthylamine | 2 |
| MT carbon black (Sterling) | 80 |
| Hydrocarbons BP 300° C. | 1 |
| Naphthenic oil | 5 |
| Tetramethylthiuram monosulfide | 0.5 |
| Di-o-tolylguanidine | 0.5 |
| Ethylene thiourea | 0.5 |
| Sulfur | 1 |
| Vulcanization conditions 30 minutes at 153° C. | |
| MIXTURE D (NBR) | |
| Nitrile rubber (42% acrylonitrile) | 100 |
| Stearic acid | 1 |
| Zinc oxide | 5 |
| Dibutyl phthalate | 10 |
| SRF carbon black | 65 |
| Terpene resin | 10 |
| Tetramethylthiuram disulfide | 0.31 |
| Sulfur | 1 |
| Vulcanization conditions: 25 minutes at 153° C. | |
| MIXTURE E (IIR) | |
| Butyl rubber | 100 |
| Stearic acid | 1 |
| Zinc oxide | 5 |
| HAF carbon black | 50 |
| Dibenzothiazyl disulfide | 1 |
| Tellurium diethyldithiocarbamate | 1.5 |
| Sulfur | 1 |
| Vulcanization conditions: 30 minutes at 153° C. | |

By dispersion in water, binders were obtained from the following substances:

(1) Copolymerizate from polyvinylidene chloride and methyl acrylate in the form of an about 55% commercial dispersion (PVDC/AM).

(2) Copolymerizate of butadiene and acrylonitrile (30%) in the form of a commercial latex with about 55% to 58% solids (Nitrile-K).

(3) p-Dinitroso-benzene (DNB)

(4) Phenol/formaldehyde resin (resol type, water-insoluble (Resol).

(5) Phenol/formaldehyde condensate (water-soluble) (Ph-F-K).

(6) Masked isocyanate (reaction product of the adduct from 1 mol of trimethylol propane, with 3 mols of toluylene diisocyanate, with butanone oxime) (Isocyanate).

(7) Polyvinyl pyrrolidone (K-value 70) in the form of a 30% aqueous solution (PVP).

(8) Addition product of 20 mols of ethylene oxide onto 1 mol of nonylphenol (Emulsifier).

(9) Zinc oxide (ZnO)

(10) Carbon black

(11) Stearyl behenate (Antifoam agent)

(12) Water

The following Table 1 contains the composition of the binders I to X with reference to the individual substances 1 to 12.

test, pieces were stored at room temperature for 24 hours, the rubber coat was peeled off in an angle of 45 degrees. The peeling strength and the tear pattern were determined according to the standard. In addition, the peeling strength was also determined in hot water of 95° (HWT).

The results are compiled in Table 2. The peeling values and the tear patterns are given as determined for the individual rubbers in connection with the binders I to X. The numbers in front of R indicate in % the separation within the rubber coat. In those cases where 100 was not attained, the separation is either between the rubber and binder, and/or the metal is exposed.

TABLE 2

| Binder | Rubber NR | | | Rubber SBR | | | Rubber CR | | | Rubber NBR | | | Rubber IIR | | |
|---|---|---|---|---|---|---|---|---|---|---|---|---|---|---|---|
| | daN/in | Tear pattern | HWT Tear pattern | daN/in | Tear pattern | HWT Tear pattern | daN/in | Tear pattern | HWT Tear pattern | daN/in | Tear pattern | HWT Tear pattern | daN/in | Tear pattern | HWT Tear pattern |
| I | 36 | 80 R | 50 R | 70 | 100 R | 70 R | 46 | 100 R | 100 R | 25 | 0 R | 0 R | 48 | 100 R | 100 R |
| II | 24 | 60 R | 50 R | 61 | 100 R | 50 R | 30 | 70 R | 20 R | 18 | 0 R | 0 R | 41 | 100 R | 100 R |
| III | 38 | 100 R | 40 R | 74 | 100 R | 100 R | 48 | 100 R | 100 R | 36 | 70 R | 50 R | 40 | 100 R | 100 R |
| IV | 30 | 100 R | 100 R | 72 | 100 R | 100 R | 46 | 100 R | 80 R | 35 | 60 R | 40 R | 41 | 100 R | 100 R |
| V | 36 | 100 R | 100 R | 72 | 100 R | 100 R | 49 | 100 R | 100 R | 28 | 80 R | 20 R | 40 | 100 R | 100 R |
| VI | 38 | 100 R | 100 R | 76 | 100 R | 100 R | 47 | 100 R | 100 R | 33 | 60 R | 70 R | 42 | 90 R | 70 R |
| VII | 36 | 100 R | 100 R | 72 | 100 R | 100 R | 53 | 100 R | 100 R | 40 | 90 R | 50 R | 44 | 100 R | 100 R |
| VIII | 42 | 100 R | 100 R | 78 | 100 R | 100 R | 52 | 100 R | 100 R | 48 | 100 R | 100 R | 42 | 100 R | 100 R |
| IX | 42 | 100 R | 100 R | 78 | 100 R | 100 R | 52 | 100 R | 100 R | 50 | 100 R | 100 R | 40 | 100 R | 100 R |
| X | 44 | 100 R | 100 R | 74 | 100 R | 100 R | 51 | 100 R | 100 R | 49 | 100 R | 100 R | 41 | 100 R | 100 R |

These results indicate the consistent better results obtained (100 R) with the aqueous binder of the present invention containing the masked isocyanate component (c).

TABLE 1

| Substance | Binder | | | | | | | | | |
|---|---|---|---|---|---|---|---|---|---|---|
| | I | II | III | IV | V | VI | VII | VIII | IX | X |
| (1) PVDC/AM | 843 | — | 843 | — | 843 | — | 843 | 843 | — | — |
| (2) Nitrile-K | — | 843 | — | 843 | — | 843 | — | — | 843 | 843 |
| (3) DNB | 253 | 253 | 253 | 253 | 253 | 253 | 253 | 253 | 253 | 253 |
| (4) Resol | 42 | 42 | — | — | — | — | 42 | — | 42 | — |
| (5) Ph-F-K | — | — | 42 | 42 | — | — | — | 42 | — | 42 |
| (6) Isocyanate | — | — | — | — | 168 | 168 | 168 | 168 | 168 | 168 |
| (7) PVP | 28 | 28 | 28 | 28 | 28 | 28 | 28 | 28 | 28 | 28 |
| (8) Emulsifier | 12 | 12 | 12 | 12 | 12 | 12 | 12 | 12 | 12 | 12 |
| (9) ZnO | 8 | 8 | 8 | 8 | 8 | 8 | 8 | 8 | 8 | 8 |
| (10) Carbon black | 97 | 97 | 97 | 97 | 97 | 97 | 97 | 97 | 97 | 97 |
| (11) Antifoam agent | 8 | 8 | 8 | 8 | 8 | 8 | 8 | 8 | 8 | 8 |
| (12) Water | 1709 | 1709 | 1709 | 1709 | 1583 | 1583 | 1541 | 1541 | 1541 | 1541 |

Binders I, II, III and IV are comparison binders containing no masked isocyanate of component (c) of the present invention. Each of binders V, VI, VII, VIII, IX and X contain per 1000 parts of the film-forming polymer of component (a), 300 parts of component (b), from 0 to 50 parts of adhesion-improving resins, about 200 parts of component (c), 23 parts of component (d), 14 parts of emulsifier, with a total of from 148 to 198 parts of component (e).

Plate samples of cold-rolled steel were degreased with 1,1,1-trichloroethane vapor, blasted with chilled iron grit, and again treated with trichloroethane vapor. Subsequently, the plates were dipped into a 20% solution containing equal parts of Novolak and chlorinated natural rubber (65% Cl).

After drying, the plates were coated with the binders by dipping. The plates were bonded with the rubber mixtures A,B,C,D and E according to ASTM D 429, method B, by vulcanization in the press under a pressure of 60 daN/cm². The amount of rubber used was so selected that a coat of 5 mm was obtained. After the The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous binder dispersion for use in the production of composite bodies by vulcanizing a vulcanizable rubber composition on a solid metal which is stable under vulcanization conditions consisting essentially of water and at least one emulsifier and a solids content of from 20% to 50% by weight of a solids composition of:
(a) per 1000 parts by weight of a polymer selected from the group consisting of polyvinylidene chloride, vinylidene chloride/alkyl acrylate copolymers, butadiene/acrylonitrile copolymers and mixtures thereof,
(b) from 100 to 500 parts by weight of at least one aromatic poly-C-nitroso compound, (c) from 50 to 300 parts by weight of masked polyfunctional isocyanates selected from the group consisting of aromatic diisocyanates, alkylene diisocyanates and aromatic polyisocyanates, masked with masking agents selected from the group consisting of tert.-alkanols, compounds containing a carbonyl-activated methylene group, dicarboxylic acid imides and sodium hydride, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents, said aqueous binder dispersion not exceeding 5% by weight of the liquid phase of organic solvents.

2. The improvement in the process of producing composite bodies by bonding vulcanizable rubber compositions to solid metals stable under vulcanization conditions comprising coating a solid metal stable under vulcanizing conditions with an adhesion assistant or binder, laminating a vulcanizable rubber composition thereto and vulcanizing the laminate, the improvement consisting of employing an aqueous binder dispersion consisting essentially of water and at least one emulsifier and a solids content of from 20% to 50% by weight of a solids composition of:

(a) per 1000 parts by weight of a polymer selected from the group consisting of polyvinylidene chloride, vinylidene chloride/alkyl acrylate copolymers, butadiene/acrylonitrile copolymers and mixtures thereof, (b) from 100 to 500 parts by weight of at least one aromatic poly-C-nitroso compound, (c) from 50 to 300 parts by weight of masked polyfunctional isocyanates selected from the group consisting of aromatic diisocyanates, alkylene diisocyanates and aromatic polyisocyanates, masked with masking agents selected from the group consisting of tert.-alkanols, compounds containing a carbonyl-activated methylene group, dicarboxylic acid imides and sodium hydride, (d) from 20 to 100 parts by weight of a water-soluble polymer selected from the group consisting of polyvinyl pyrrolidone and water-soluble copolymers of vinyl pyrrolidone, and (e) from 5 to 500 parts by weight of customary fillers and pigments, adhesion-improving resins based on formaldehyde condensation products, adhesion-improving condensation products based on epichlorohydrin condensation products, emulsifiers and antifoam agents, said aqueous binder dispersion not exceeding 5% by weight of the liquid phase of organic solvents, as said adhesion assistant or binder.

* * * * *

UNITED STATES PATENT AND TRADEMARK OFFICE
CERTIFICATE OF CORRECTION

PATENT NO. : 4,336,171
DATED : June 22, 1982
INVENTOR(S) : HANS-PETER KOHLSTADT et al.

It is certified that error appears in the above—identified patent and that said Letters Patent is hereby corrected as shown below:

Column 9, line 7, before "dicarboxylic", insert --and--;
        lines 7 and 8, cancel "and sodium hydride".

Column 10, line 16, before "dicarboxylic", insert --and--;
        lines 16 and 17, cancel "and sodium hydride".

Signed and Sealed this

Ninth Day of November 1982

[SEAL]

*Attest:*

GERALD J. MOSSINGHOFF

*Attesting Officer*     *Commissioner of Patents and Trademarks*